(12) United States Patent
Deger et al.

(10) Patent No.: US 6,446,690 B1
(45) Date of Patent: Sep. 10, 2002

(54) ANTISLIPPING DEVICE

(75) Inventors: Werner Deger, Lauchheim; Helmut Kaiser, Aalen-Unterkochen; Thilo Ernst Schaffert, Obersontheim; Eugen Liesch, Aalen-Unterkochen, all of (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/622,723

(22) PCT Filed: Mar. 19, 1999

(86) PCT No.: PCT/DE99/00913

§ 371 (c)(1),
(2), (4) Date: Aug. 21, 2000

(87) PCT Pub. No.: WO99/47370

PCT Pub. Date: Sep. 23, 1999

(30) Foreign Application Priority Data

Mar. 20, 1998 (DE) .......................... 198 13 831

(51) Int. Cl.[7] ............................................. B60C 27/10
(52) U.S. Cl. ....................................... 152/233; 152/217
(58) Field of Search ............................... 152/171, 173, 152/185, 213 R, 217, 219, 231, 233

(56) References Cited

U.S. PATENT DOCUMENTS

| 2,685,321 A | * | 8/1954 | Petrie | 152/217 |
| 3,945,162 A | | 3/1976 | Martinez | |
| 5,082,039 A | * | 1/1992 | Franklin | 152/219 |
| 5,236,025 A | * | 8/1993 | Maresh | 152/219 |

FOREIGN PATENT DOCUMENTS

| DE | 3427604 | 3/1985 |
| DE | 4225802 | 2/1994 |
| DE | 19702815 | 11/1998 |
| WO | 8102870 | 10/1981 |

* cited by examiner

Primary Examiner—Russell D. Stormer
(74) Attorney, Agent, or Firm—Mark P. Stone

(57) ABSTRACT

An anti-slipping device has a tread network of chains connected to an external mounting by terminal links (20) of segments of chains (4, 5) of the network, and the external mounting is configured as a disc (13) in its peripheral area. The terminal links (20) are hooked into retaining anchors (19) formed by sections of a wire (18) which is held in place in guide channels (17) on the outside of the disc (13).

17 Claims, 3 Drawing Sheets

ANTISLIPPING DEVICE

The invention relates to an anti-skid device having a running net which is connected by connecting elements at a plurality of connecting points Lo an inner fixing device and to an outer fixing device which is designed as a disc in the vicinity of the circumference of said inner fixing device, the connecting elements which are assigned to the outer fixing device being designed as end elements of chain elements which are aligned perpendicularly with respect to the edge of the tire.

An anti-skid device of the above type is known from the German patent application 19702815.2-16. In the known anti-skid device, the connecting elements of end elements are formed by end elements of chain sections, running obliquely with respect to the rolling direction of the vehicle wheel, of the running net. The end elements engage here with their front parts in holes which are arranged in the direct vicinity of the outer edge of the disc. The effort required in terms of fabrication to connect the disc to the running net is considerable with this solution and is difficult to reconcile with the fact that anti-skid devices are mass-produced articles. A faster and simpler connection can be achieved by using so-called side hooks as connecting elements, but these must, as is known for example from WO 81/02870, themselves firstly be connected to the end elements of the chain sections of the running net. Furthermore, possible connecting elements would also be double hooks and spring hooks of the type known from DE 34 27 604 A1, but these are excessively expensive.

Finally, DE 42 25 802 C2 discloses a rim protection which is composed of a ring-shaped disc and in which the disc is provided on its outer side with fixing clips which are distributed uniformly over the circumference of the disc and into which sections of an outer fixing device which is formed by an enclosed side chain can be clipped. However, in this case the possibility of using the disc as part of an outer fixing device is not considered but instead the emphasis is placed on the possibility of releasing the rim protection from the actual anti-skid device.

The invention is based on the object of providing an anti-skid device of the type under consideration, in which the running net can be connected to the outer fixing device in a particularly economical way and in which the method of connection provides the possibility-of using an identical running net for tires whose size varies within a certain range. This object is achieved according to the invention in that the end elements which are assigned Lo the outer fixing device are connected to fixing fittings which are formed by sections of a wire which is respectively guided and secured on each side of the respective connecting point in guide channels which are arranged in the vicinity of the outer edge of the disc.

The anti-skid device according to the invention provides the advantage that the fixing fittings can easily be introduced into the clear internal spaces of the end elements and the wire sections which form them can be pushed either simultaneously or subsequently into the guide channels in which they are secured frictionally and/or positively or by means of spring force. The anti-skid device can be adapted to different tire sizes using differently shaped fixing fittings.

Further details and features of the invention emerge from the subclaims and from the following description of a particularly advantageous embodiment of the invention which is illustrated in the appended drawing, in which:

Figure 1:
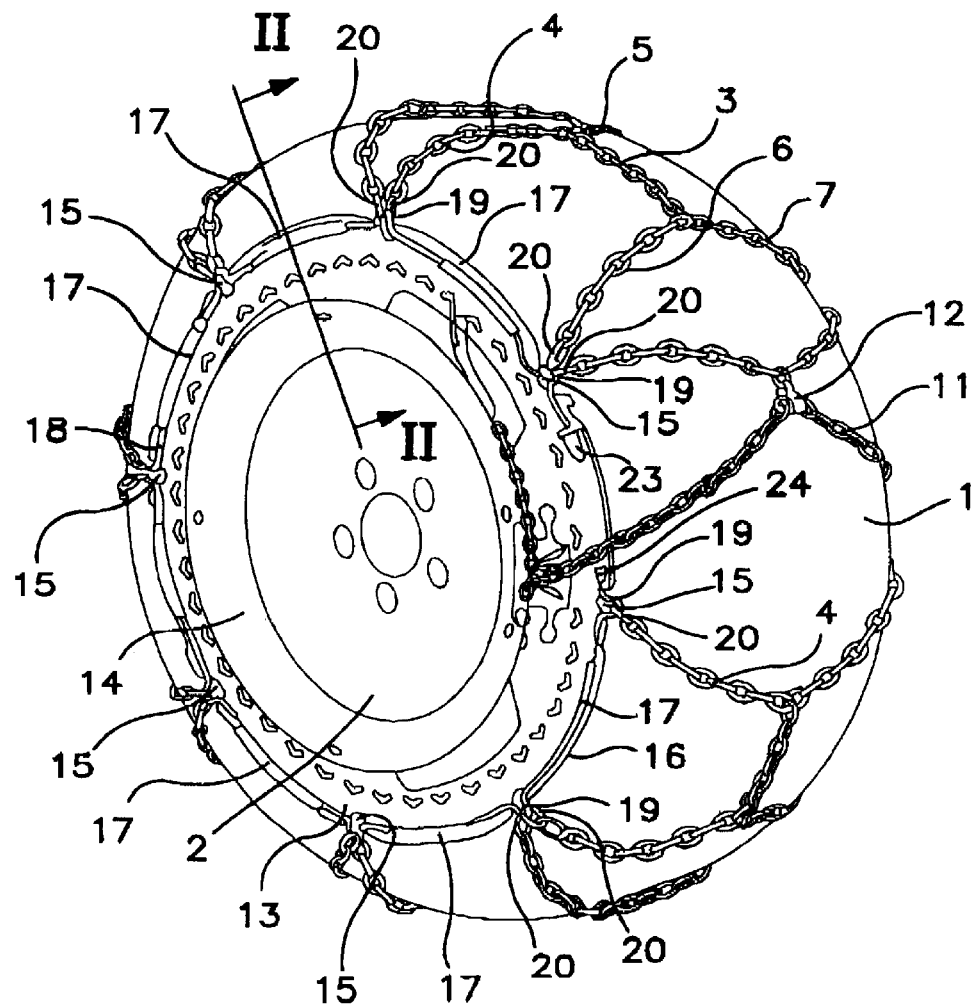
FIG. 1 shows, viewed obliquely from the front, an anti-skid device which is mounted on a vehicle tire.

In FIG. 1, 1 is a vehicle tyre which is fitted onto a light-alloy rim 2 and equipped with an anti-skid device whose running net is composed essentially of intersections which follow one another along the tread in the circumferential direction of the tire and each of which is formed by a longitudinal chain element 3 and four oblique chain elements 4, 5, 6, 7. The oblique chain elements 5 and 7 are connected in a known fashion to an inner fixing device 8 which is formed by a spring steel strap whose ends 9 and 10 are connected to one another by means of a tensioning chain 11 which is guided over the tread of the tire 1 to the outer fixing device of the anti-skid device and passes a guide eyelet 12.

The outer fixing device includes an essentially ring-shaped disc 13 and a retainer ring 14 which is connected to it. Both abovementioned components are expediently designed as plastic injection-molded components. In the vicinity of its outer edge 16 which is provided with cut-outs 15 which are opened in a direction facing towards the outer edge 16, the disc 13 has guide channels 17 facing towards the center of the disc and which run equidistantly from the outer edge 16 and have essentially an L-shaped cross section. The guide channels 17 serve to fix a strap-shaped wire 18 which has sections which are bent at right angles in a generally U-shaped configuration in the vicinity of the cut-outs 15 and which form fixing fittings 19 for connecting elements which are composed, in the case illustrated, of end elements 20, aligned perpendicularly with respect to the edge of the tire 1, of the oblique chain elements 4 and 6.

Figure 2:
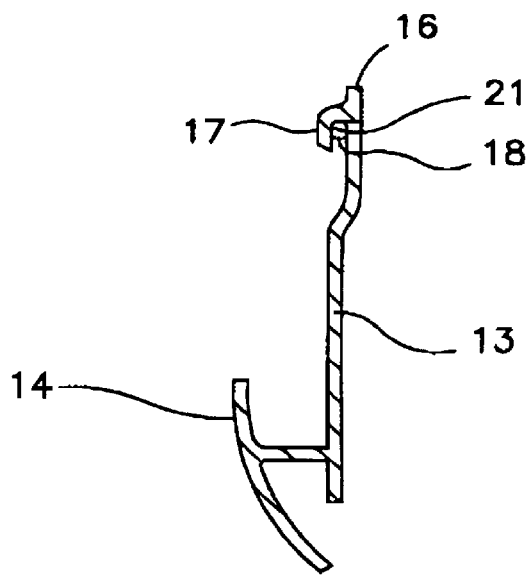
FIG. 2 shows a section along the line II—II in FIG. 1.

As is clear from FIG. 2, the guide channels 17 are formed by essentially L-shaped webs whose limbs which run parallel Lo the disc 13 have a latching recess 21 for the wire 18. The wire 18 is held in position frictionally and positively owing to a certain elasticity of the webs which form the guide channels 17. The described design of the guide channels permit short wire elements also to be used instead of a continuous wire 18. However, it has proven particularly favourable to use a wire which is embodied, like the inner fixing device 8 of the anti-skid device, as a spring steel strap.

Figure 3:
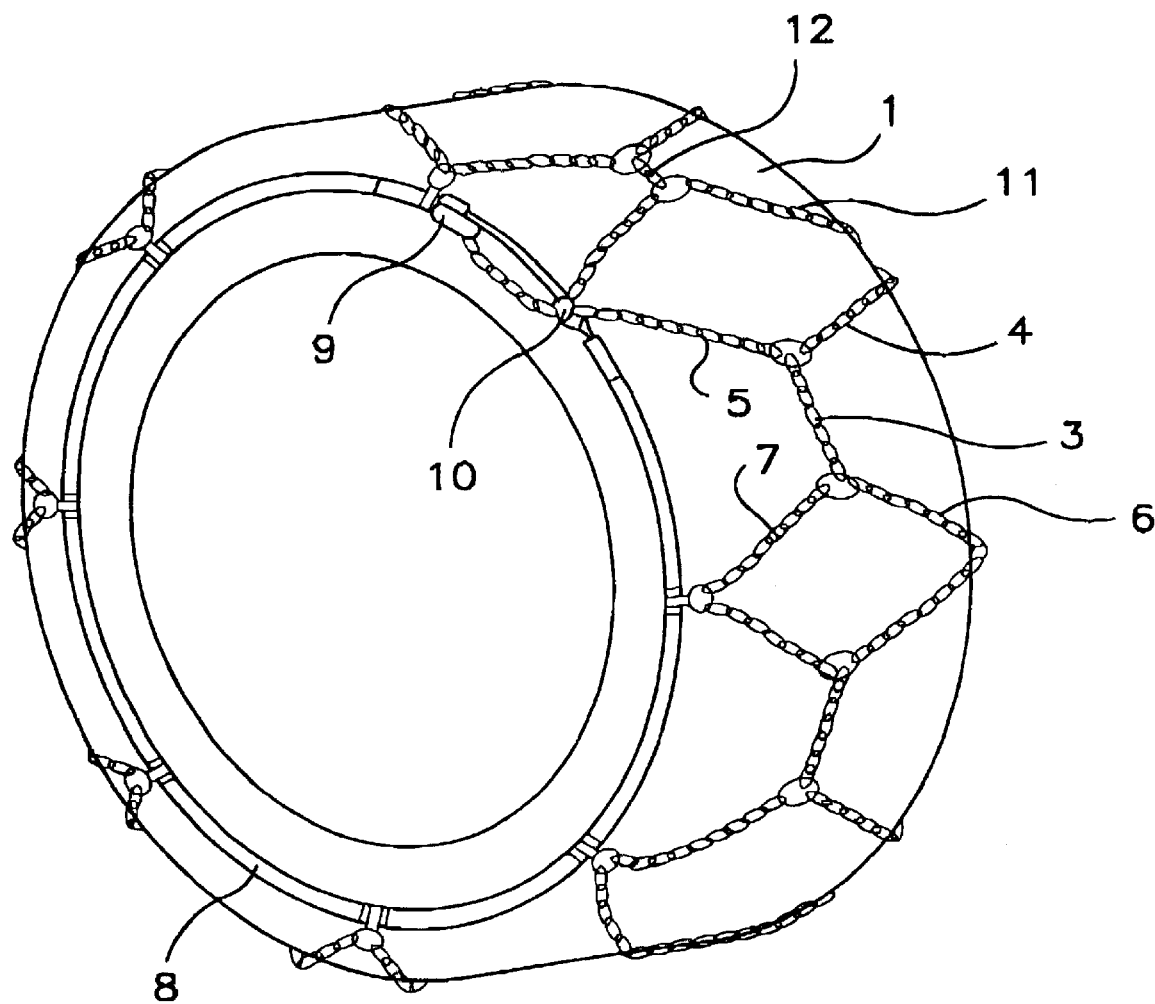
FIG. 3 shows, viewed obliquely from the rear, the anti-skid device according to FIG. 1.
Figure 4:
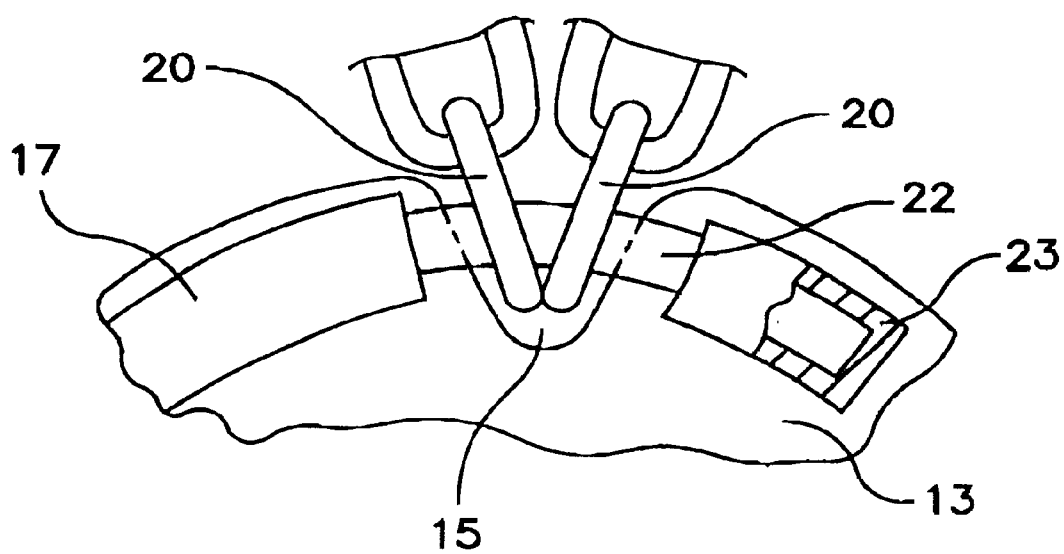
FIG. 4 shows a modification of the anti-skid device according to FIG. 1.

Instead of fixing fittings 19 which are bent at right angles as in the embodiment shown in FIGS. 1 to 3, it is also possible to use fixing fittings 22 which are, as illustrated in FIG. 4, only slightly curved, run parallel to the outer edge 16 of the disc and permit the anti-skid device to be used on a relatively small tire.

In order to ensure that the wire 18 does not become twisted with respect to the disc 13, end stops 23 and 24 which prevent rotary movements and act on the end faces of the wire ends are arranged in the vicinity of the ends of the wire 18.

What is claimed is:

1. An anti-skid device adapted to be mounted to a vehicle tire, said anti-skid device comprising a running net, an inner fixing device, an outer fixing device comprising a disc proximate to an outer surface thereof, and a plurality of connecting elements for connecting said inner fixing device to said outer fixing device at a plurality of connecting points; said connecting elements connected to said outer fixing device comprising end elements of chain elements of said running net; said disc (13) of said outer fixing device having an outer edge (16) and a plurality of guide channels (17) proximate to said outer edge (16), and at least one wire (18)

received, in part, in said guide channels (17); and fixing fittings (19) defined by portions of said at least one wire extending between adjacent said guide channels (17), said end elements (20) of said chain elements being connected to said fixing fittings (19).

2. Anti-skid device according to claim 1, wherein said wire (18) is a continuous wire, and each of said end elements (20) is threaded on said continuous strap-shaped wire.

3. Anti-skid device according to claim 1, wherein said wire (18) comprises a plurality of individual wire sections, each of said fixing fittings being defined by a different one of said individual wire sections extending between said adjacent guide channels (17).

4. Anti-skid device according to claim 2, wherein said disc (13) defines, proximate to said fixing fittings (19), cut-out sections (15) which are opened in a direction facing towards the outer edge of said disc.

5. Anti-skid device according to claim 1, wherein said guide channels (17) are opened in a direction facing towards the center of said disc (13) and are formed by webs running at a constant distance from said outer edge (16) of said disc (13) and are essentially L-shaped in cross section.

6. Anti-skid device according to claim 5, wherein each of said webs forming said guide channels (17) has a limb running essentially parallel to the outside of said disc (13), and a latching recess (21) provided on said limb for receiving said at least one wire (18).

7. Anti-skid device according to claim 1, wherein said fixing fittings (19) are formed by U-shaped sections of said wire (18).

8. Anti-skid device according to claim 1, wherein said portions of said at least one wire (18) forming said fixing fittings (22) run parallel to the outer edge (16) of said disc (13).

9. Anti-skid device according to claim 1, wherein said chain elements comprising said running net intersect along a tread portion of said vehicle tire when said anti-skid device is mounted to said vehicle tire, said running net comprising a longitudinal chain element (3) and four oblique chain elements (4, 5, 6, 7).

10. Anti-skid device according to claim 9, wherein said end elements (20) of said chain elements (4, 6) are connected to at least some of said fixing fittings (19).

11. Anti-skid device according to claim 2, wherein said continuous wire (18) is formed from spring steel.

12. Anti-skid device according to claim 2, wherein said device includes end stops (23, 24) acting on said continuous wire (18) for preventing rotary movement of said wire (18) relative to said disc (13).

13. Anti-skid device according to claim 3, wherein said disc (13) defines, proximate to said fixing fittings (19), cut-out sections (15) which are opened in a direction facing towards the outer edge of said disc.

14. Anti-skid device according to claim 2, wherein said fixing fittings (19) are formed by U-shaped sections of said wire (18).

15. Anti-skid device according to claim 3, wherein said fixing fittings (19) are formed by U-shaped sections of said wire (18).

16. Anti-skid device according to claim 2, wherein said portions of said at least one wire (18) forming said fixing fittings (22) run parallel to the outer edge (16) of said disc (13).

17. Anti-skid device according to claim 1, wherein said wire (18) is formed from spring steel.

* * * * *